US008233435B2

(12) United States Patent
Cordeiro et al.

(10) Patent No.: US 8,233,435 B2
(45) Date of Patent: Jul. 31, 2012

(54) INTER-CHANNEL COMMUNICATION METHODS IN MULTI-CHANNEL WIRELESS NETWORKS

(75) Inventors: Carlos M. Cordeiro, Ossining, NY (US); Bong-Jun Ko, Nanuet, NY (US); Kiran S. Challapali, New City, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 562 days.

(21) Appl. No.: 12/517,208

(22) PCT Filed: Dec. 3, 2007

(86) PCT No.: PCT/IB2007/054908
§ 371 (c)(1),
(2), (4) Date: Jun. 2, 2009

(87) PCT Pub. No.: WO2008/068711
PCT Pub. Date: Jun. 12, 2008

(65) Prior Publication Data
US 2010/0034143 A1      Feb. 11, 2010

Related U.S. Application Data

(60) Provisional application No. 60/868,404, filed on Dec. 4, 2006, provisional application No. 60/870,443, filed on Dec. 18, 2006.

(51) Int. Cl.
*H04W 4/00* (2009.01)
(52) U.S. Cl. ........................................ 370/328; 370/338
(58) Field of Classification Search .................. 370/328, 370/329, 338, 315
See application file for complete search history.

(56) References Cited

U.S. PATENT DOCUMENTS

| 7,680,089 | B2* | 3/2010 | Wu et al. ..................... 370/338 |
| 7,787,416 | B2* | 8/2010 | Gidwani ..................... 370/329 |
| 7,933,247 | B2* | 4/2011 | Gidwani ..................... 370/332 |
| 2004/0233855 | A1 | 11/2004 | Gutierrez | |
| 2005/0185632 | A1 | 8/2005 | Draves | |
| 2005/0288047 | A1 | 12/2005 | Ananthanarayanan | |
| 2006/0030318 | A1 | 2/2006 | Moore | |
| 2006/0104232 | A1* | 5/2006 | Gidwani ..................... 370/328 |
| 2006/0215593 | A1 | 9/2006 | Wang | |

FOREIGN PATENT DOCUMENTS

| EP | 1246487 A2 | 2/2002 |
| EP | 1594268 A2 | 9/2005 |

(Continued)

OTHER PUBLICATIONS

P Mohapatra et al., "Group Communications in Mobile Ad Hoc Network", IEEE Computer Society, vol. 37, Issue 2, pp. 52-59.

(Continued)

*Primary Examiner* — Brian D Nguyen
(74) *Attorney, Agent, or Firm* — Larry Liberchuk

(57) ABSTRACT

A network information apparatus (400), system (100) (200) and method for distributing network information in a multi-channel (MC) wireless network (100) (200), comprising a network information module (400) that implements inter-channel communication of network information in an MC network according to a pre-determined network information sharing procedure and keeping an own cache (401) of each node refreshed and free of out-of-date information, and, for an active proxy-based sharing procedure thereof only, adapting to changes in node/channel associations, suppressing duplicate inter-channel information, and synchronizing own clocks (404) of each node.

22 Claims, 2 Drawing Sheets

FOREIGN PATENT DOCUMENTS

| WO | WO03067827 A1 | 8/2003 |
|---|---|---|
| WO | WO2004053940 A2 | 6/2004 |

OTHER PUBLICATIONS

Srinivas Krishnamurthy et al., "Brief Announcement: Synchronous Distributed Algorithms for Node Discovery Configuration in Multi-Channel Cognitive Radio Networks", Distributed Computing Lecture Notes in Computer Scinece, LNCS, vol. 4167, Jan. 1, 2006, pp. 572-574, XP019043314.

Yih-Chun Hu et al., "Caching Strategies in On-Demand Routing Protocols for Wireless Ad Hoc Networks", International Conference on Mobile Computing and Networking Archive Proceedings of the 6th Annual Int'l Conference on Mobile Computing and Networking, pp. 231-242, 2000.

Xin Yu et al., A distributed Adaptive cache Update Algorithm for the Dynamic Source Routing Protocol, INFOCOM 2005, 24th Annual joint Conference of the IEEE Computer and communications Societies, Proceedings IEEE, vol. 1, Mar. 13-17, 2005, pp. 730-739.

* cited by examiner

|  | PROXY-BASED | SOURCE-BASED |
|---|---|---|
| ACTIVE | HOME PROXY CACHES GC PACKETS AND TRANSMITS THEM THROUGH FOREIGN CHANNELS | SOURCE IS RESPONSIBLE FOR VISITING FOREIGN CHANNELS AND TRANSMITTING GC PACKETS |
| PASSIVE | N/A | SOURCE HOLDS GC PACKETS IN INTERNAL CACHE AND TRANSMITS THEM ONCE A FOREIGN PROXY VISITS ITS HOME CHANNEL. FOREIGN PROXY RETRANSMITS ALL GC PACKETS ONCE IT IS BACK ON ITS HOME CHANNEL. |

FIG. 3

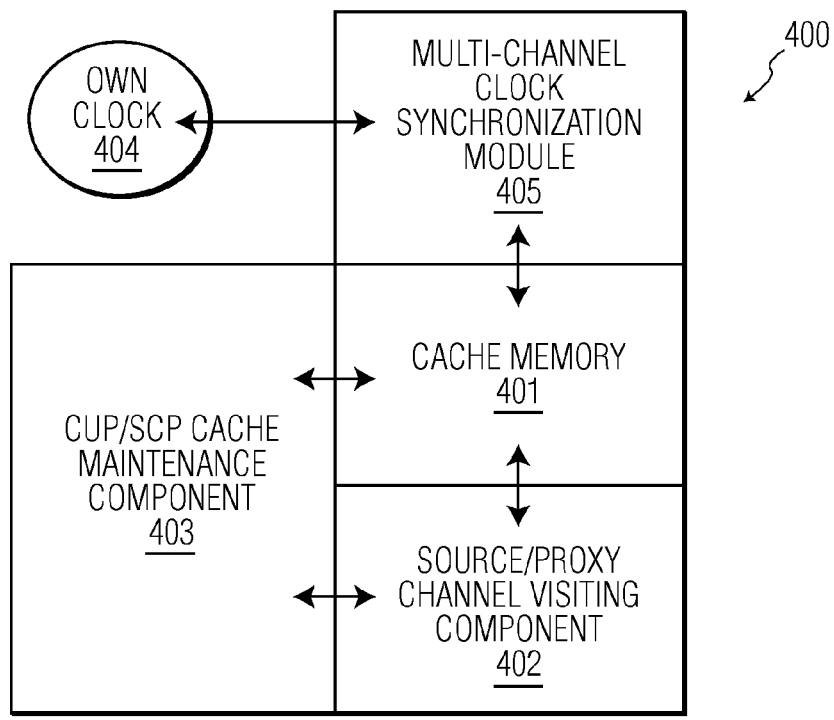

FIG. 4

INTER-CHANNEL COMMUNICATION METHODS IN MULTI-CHANNEL WIRELESS NETWORKS

The present invention relates to the use of proxy nodes for inter-channel communication in multi-channel wireless networks and the associated methods.

With the promise of improved efficiency of spectrum usage, improved performance, and low cost/complexity, new types of medium access control (MAC) protocols capable of dynamically managing multiple frequency channels, so called Multi-Channel (MC) MAC protocols, are receiving increasing attention. With this new generation of MAC protocols, a number of technical challenges are also introduced. For example, a major challenge in this type of network is defining a technique for a node to send a group communication packet (e.g., multicast or broadcast) to all its neighbors, given that these neighbors can be tuned to different channels.

In particular, in spectrum-agile radio (a.k.a. cognitive radio) networks, wireless nodes are able to opportunistically utilize the time and frequency of the radio spectrum which would have been otherwise allocated solely to the higher priority users (called the "incumbents"). This technology opens up a vast opportunity for new wireless network applications to use a wide range of the radio spectrum, while preserving the privileges of legacy licensed spectrum users. Clearly, an efficient MAC protocol that can support multiple channels is required to exploit the abundant radio spectrum space potentially available for spectrum-agile radio networks. Existing MC MAC protocols often rely on a single, common rendezvous channel to enable nodes on multiple channels to exchange network management messages (in this invention, the term management can refer to either data, control, or actual management information, or any combination thereof). However, this rendezvous channel approach is not applicable to spectrum-agile radio networks because of a scalability issue and temporal unavailability of the channels due to incumbent detection.

In an MC environment, existing MC-MAC protocols typically keep track of a node's neighbors by using some sort of cache, even though they may not be on the same channel. Given this cache, nodes can take advantage of the use of multiple channels while enjoying the connectivity which would otherwise be available only with single channel networks. However, information stored in a node's cache about other channels needs to be managed, both in terms of preventing it from becoming stale as well as keeping it up-to-date, i.e., two problems in MC environments currently need a solution, namely, the Stale Cache Problem and the Cache Update Problem Last, but not the least, an efficient communication mechanism is needed such that nodes on different channels can maintain and exchange network management information without the use of a designated rendezvous channel.

The present invention provides a mechanism for a plurality of nodes on different channels to exchange network control and data information on each channel that is carried by "proxy" nodes to the nodes of other channels. The present invention scales well to the size of a multi-channel wireless network and the number of channels thereof, and can be used in many applications in multi-channel wireless networks.

To address the group communication (GC) challenge in MC wireless networks, two mechanisms are provided, namely, source-based and proxy-based, which do not depend on either a fixed common channel or on tight time synchronization. In fact, each channel is treated equally with no special status. In addition, both mechanisms are fully distributed, can be applied jointly, and offer different trade-offs. All these characteristics enable these mechanisms to operate with a single transceiver, work on spectrum-agile radio networks, and be scalable. These two mechanisms can successfully support group communication in multi-channel wireless networks, even when nodes possess a single radio transceiver.

For management of the cached information regarding other nodes, the present invention provides solutions employing timeouts and sequence numbers to each of the Stale Cache and Cache Update problems, respectively.

FIG. 3 illustrates the characteristics of a proxy-based approach compared with a source-based approach of the present invention; and FIG. 4 illustrates a node apparatus according to the present invention.

Figure 1:
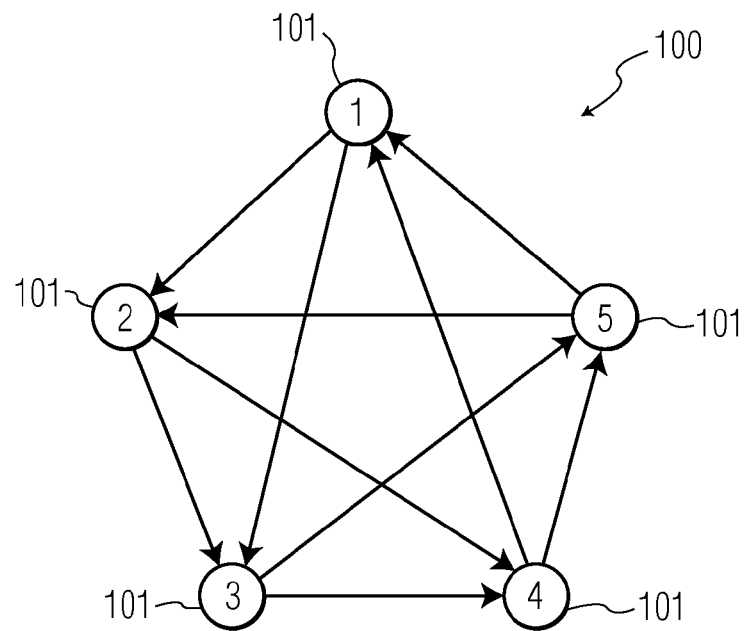
FIG. 1 illustrates an example of a multi-channel system according to the present invention having a number of channels N i=5, and for each channel i, $C(i)=\{(i+1) \bmod 5, (i+2) \bmod 5\}$.

The present invention can be readily understood by one skilled in the art in view of the following detailed description with reference to the accompany drawings presented for only illustrative purposes. In the drawings, the same reference symbol denotes identical components in order to eliminate redundant description thereof.

In wireless networks, the important information about the network status is often carried in special management packets called 'beacon packets', which are typically broadcast periodically by network nodes. Examples of the information these beacon packets contain include network identifier, neighboring node list, synchronization timer, capacity of nodes, and channel reservation status.

By transmitting or listening to these broadcast beacon packets, network nodes can perform several operations related to network management, such as synchronizing their timers, learning and propagating channel reservation status, discovering their neighbors, etc. In single channel wireless networks, the transmission mechanism of beacon packets is relatively simple: beacons are transmitted by network nodes periodically at scheduled times, either using TDMA (time-slot reservation) or CSMA (contention-based random access). Since beacon packets are broadcast packets, network nodes in a single channel wireless network can easily obtain the network management information by listening to the channel medium for a specific amount of time (for example, multiples of the beacon period at which the beacons are transmitted).

However, in multi-channel wireless networks, where networks nodes are tuned to multiple different channels, broadcasting the beacon packets to the whole network becomes a challenging problem since a beacon packet transmitted on one channel may not be heard by nodes on other channels. Existing multi-channel wireless MAC protocols often address this problem by employing a rendezvous channel, on which all nodes in multi-channel networks gather for a specific time duration at a specific time. However, this rendezvous channel approach introduces a bottleneck point in network capacity when the number of nodes (hence the number of broadcast packets) is large and also not suitable to the cognitive radio paradigm where channel availability changes over time depending upon the detection of higher priority incumbents.

The present invention removes the aforementioned bottleneck that exists in the single rendezvous channel approach, and allows nodes on different channels to propagate and listen to the broadcast information. To achieve this, a multi-hop communication between nodes on different channels is introduced, where the multi-hop communication is incurred by the separation between nodes in the channel space, not in the geographic space. In this mechanism, the information in the broadcast packets (e.g., beacons) or data packets (e.g., group communication packets) transmitted on one channel is relayed to the nodes on other channels by one of a source-based approach or a proxy-based approach.

First Exemplary Embodiment—Proxy-Based Approach

In a first exemplary embodiment, nodes are dispatched to other channels on behalf of the other nodes in the same channel and are called 'proxy nodes' and the approach is termed a proxy-based approach, described below.

a. Distributed Multi-channel Broadcast Mechanism

Suppose there are N channels in the multi-channel wireless network, each of which has at least one node tuned to it. These channels are indexed by 1, 2, ..., N. Let S(i) denote the set of nodes on channel i. For each node in S(i), the channel i is called the home channel, and all other channels are called the foreign channels.

In many wireless technologies (e.g., those for LAN/PAN), the time of each channel is typically divided into recurring superframes, and in every superframe, the management information can be shared by nodes in the same channel in various ways. For instance, in IEEE 802.11 IBSS networks, at every superframe, one of the participating nodes sends a broadcast beacon frame that contains essential information about the network. In WiMedia UWB (Ultra WideBand) wireless networks, every node sends out a broadcast beacon frame at a reserved time slot in a time period called a beacon period within every superframe. Nodes can also actively obtain the network management information by sending out some inquiry message to other nodes (e.g., IEEE 802.11 Probe Request-Response frames). The present invention provides a mechanism with which nodes on different channels can efficiently share the network management information without relying on a rendezvous channel. The mechanism of the present invention is orthogonal to and can be used with any particular choice of network information sharing procedure.

For each channel, using a predetermined election technique at least one node is elected periodically as a proxy node, p(i), that is dispatched to some other channel(s). A method according to the present invention for an inter-channel communication mechanism is as follows:

1. Each channel i=1, ..., N is associated with a set of other channels, C(i), to which the proxy node p(i) of channel i is dispatched periodically. The association between channels can be represented by a graph G=(V,E), where V is the set of channels {1, ..., N} and a directed edge is drawn from a channel i in V to each channel in C(i) ⊂ V. Call this graph the channel association graph, and an example is illustrated in FIG. 1. FIG. 1 illustrates an example of a channel association in which a number of channels N is 5, and for each channel i, C(i)={(i+1) mod 5, (i+2) mod 5}. The association between channels 101 and the number of other channels in C(i) can be determined arbitrarily as long as the channel association graph G is connected. Below is disclosed a mechanism that systematically determines the channel association such that the association graph is guaranteed to be connected.

2. Periodically, node p(i) elected as the proxy node on channel i visits the foreign channels in C(i). When visiting each channel j in C(i), node p(i) participates in the network information sharing procedure (e.g., by transmitting and receiving beacons) of channel j to obtain the network management information about j and announce the network management information of channel i to nodes on channel j. The order of the channels 101 in which the proxy node visits the channels in C(i) can be determined arbitrarily. However, depending on the particular network information sharing procedure and its timing, this order of visiting foreign channels determines the time it takes for the proxy node p(i) to traverse the channels in C(i) to obtain/propagate the management information. Therefore, the proxy node preferably visits the foreign channels in an order that minimizes the foreign traversal time.

3. After visiting all channels in C(i), the proxy node returns to its home channel i, and shares the information it obtained from channels in C(i) with other nodes on channel i by participating in the network information-sharing procedure on channel i. All other nodes in channel i record the information that p(i) announces, and share the recorded information with other nodes, including proxy nodes from other channels 101, until the next proxy node from channel i updates the recorded information. Preferably, this information is stored in a local cache by each node of channel i.

4. When the proxy node returns to its home channel, the above steps 2 and 3 are repeated.

Since the association between channels 101 is made in such a way that the association graph G is connected, the information shared by nodes on each channel is eventually propagated to nodes in all other channels by the proxy nodes.

The number of foreign channels associated with each channel impacts the time it takes for the information on each channel to be propagated to all other channels: the larger the set C(i) is, the faster the broadcast information is propagated to other channels. On the other hand, the number of associated foreign channels impacts the overhead of dispatching proxy nodes to other channels: the larger the set C(i) is, the more overhead is incurred to nodes for the responsibility of being the proxy node and spending time on the channels other than their home channels.

b. Distributed Channel Association for Inter-channel Communication

In the inter-channel communication mechanism of the present invention, each channel in multi-channel wireless networks is associated with some other channels such that the network management information in each channel is eventually propagated to the nodes in all other channels. In an exemplary embodiment of the present invention, a novel systematic mechanism guarantees the connectedness of the channel association graph G. This mechanism also provides a novel method that can adapt to the requirements of the applications of the multi-channel wireless networks, by adjusting the tradeoff between the overhead of dispatching the proxy nodes and the time it takes for the network management information to be propagated to all channels.

Figure 2:
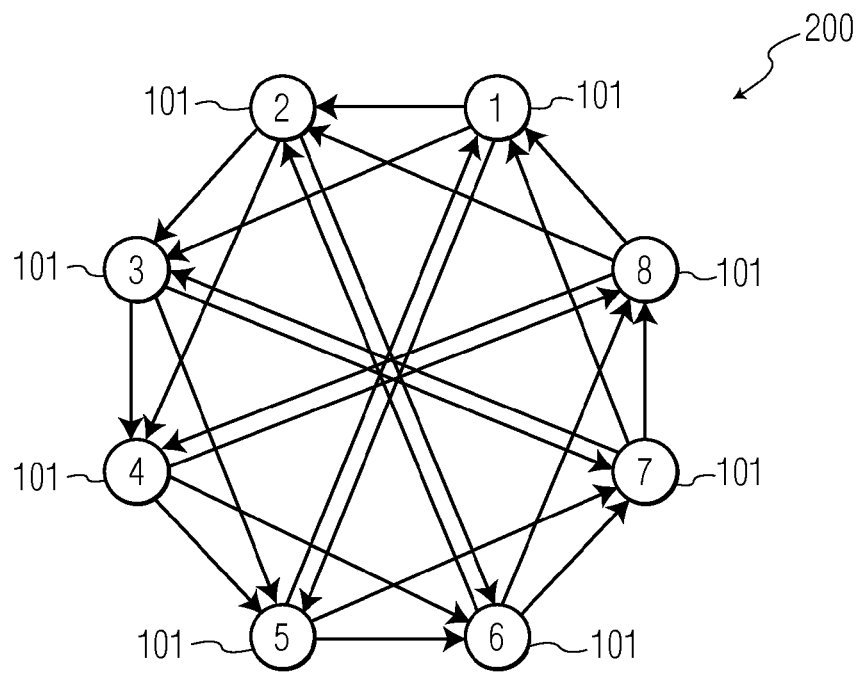
FIG. 2 illustrates an example of a multi-channel system according to the present invention having a number of channels N=8 and wherein b=2, M=2.

Given the set of channels {1, ..., N}, the basic rule to associate each channel i with a set of foreign channels, C(i), is:

$$C(i)=\{(i+b^k) \bmod N, k=0,1,\ldots,M\},$$

where b is a positive integer larger than 1 and smaller than N, and M is an integer that is larger than or equal to 0 and smaller than $\log_b N$. FIG. 2 illustrates an example of the channel association graph generated by the above association rule, where the number of channels 101 N is 8, b is 2, and M is 2.

The above-disclosed channel association mechanism can be easily adapted to the requirements of applications of multi-channel wireless networks by adjusting the parameters b and M. The smaller b is or the larger M is, the denser becomes the association graph, i.e., the quicker the information on one channel can be propagated to the other channels, with the expense of increased overhead of dispatching proxy nodes more often. For instance, if the application requires small latency in updating broadcast management information to nodes in the entire network, one can select small b and large M. On the other hand, if the requirement of the application is such that the frequency of channel switching must be minimized, then one can choose large b and small M with the expense of increased delay in obtaining the broadcast management information on other channels.

Since nodes can join or leave the wireless network and also change their home channels, and some channels may become vacant, the channel association mechanism needs to be able to adapt to the change in the occupancy of the channels by nodes. Given the parameters b and M, the distributed channel association mechanism based on the above association rule is as follows:

1. At the beginning, each node on channel i sets the associated foreign channels as $C(i)=\{(i+b^k) \bmod N, k=0, 1, \ldots, M\}$ and the proxy node attempts to visit channels in this $C(i)$.
2. If the proxy node from channel i discovers some channel j is not occupied by any node during its traversal through the channels in $C(i)$, it deletes the channel j from $C(i)$. It then sequentially visits the channels $j+1) \bmod N$, $(j+2) \bmod N, \ldots$, until it finds an occupied channel j' at which point it includes the channel j' in $C(i)$.
3. When the proxy node returns to its home channel i, it informs the other nodes in its home channel of the change in the associated foreign channel set $C(i)$. The subsequent proxy nodes visit the foreign channels in the updated $C(i)$. If during this process the subsequent proxies find that a given channel k in $C(i)$ is no longer occupied (i.e., by the absence of any beacon transmissions from other nodes), it deletes channel k from $C(i)$.
4. Periodically, the proxy node attempts to visit the original channel j, which should be associated by the basic association rule but was deleted in the above step 2, and channels $(j+1) \bmod N$, $(i+2) \bmod N, \ldots, j'-1$, to find an occupied channel between the channels j and j'. If any channel $j''(j \leq j'' < j')$ is found to be non-empty (indicated by the presence of beacon packets), the proxy node includes such a channel j'' in $C(i)$. The proxy then informs the other nodes in its home channel when it returns to the home channel.

c. Suppressing Duplicate Inter-Channel Information

Depending on the connectivity of the channel association graph, it can take several steps for the information to be relayed to other channels by proxy nodes. Furthermore, there can be many paths in the channel association graph for the channel information to take from one channel to another. For instance, given the channel association in FIG. 2, the information on channel 3 can be relayed directly to the nodes on channel 1 by channel 1's proxy node dispatched to channel 3, or it can also be relayed via two steps from channel 3 to channel 2, and finally to channel 1.

In order to suppress the duplicate information propagated across channels through multiple paths (and hence to minimize the overhead on the proxy nodes), the following exemplary method is disclosed (further details of this mechanism are provided in the Second Exemplary Embodiment below):

1. When a node announces new management information about the network status, it attaches a sequence number to the information element in the management message it transmits to other nodes. This sequence number is increased whenever new information is generated.
2. When a node (either proxy node or normal node) receives a network management message from any other node, it compares the sequence number of each information element in the message with that of the corresponding information of the same type it has received before. If the sequence number of the information element in the received message is higher then the node updates the information with that information contained in the received message and uses this new information in its own announcements in the future. Otherwise, the receiving node discards the information contained in the received message.

The first exemplary embodiment provides a basic building block of multi-channel MAC protocols, which enables nodes in multi-channel wireless networks to share important information about the status of the network without requiring them to be on a single rendezvous channel, thus further contributing to increasing the network capacity. The present invention can be used in many essential network operations such as synchronizing the clock among nodes on different channels, reserving the channel medium between a pair of nodes on different channels, updating the channel reservation information of a channel to the nodes on other channels, etc. The adaptability, in terms of the overhead and the responsiveness, is another added benefit of the present invention, which can be used both for delay-sensitive applications and for those requiring small overhead in network management.

d. Multi-channel Clock Synchronization

In wireless local and personal area networks, synchronizing clocks of nodes is an important building block for many purposes, such as medium reservation of QoS traffic, power saving operations, etc., and it is often achieved by periodic transmission of beacon packets in single channel networks. For instance, in IEEE 802.11 IBSS networks, the node that transmits the beacon frame include the timestamp of its own clock in the beacon, and other nodes adjust the timer value of their clocks according to the timestamp value in the received beacon. In WiMedia UWB networks, each node transmits a beacon frame at a designated time slot, and nodes adjust s its timer value by comparing the expected reception time of other nodes' beacons with the actual time the beacons from other nodes are received.

Using the inter-channel communication mechanism of the present invention, synchronization can be achieved among nodes distributed over multiple channels as follows:

1. Nodes on the same channel synchronize their clocks by the clock synchronization method used for single channel networks.
2. Periodically, a proxy node visits other channels and obtains clock offset information of its own clock and the clock of the nodes on other channels. The proxy then stores the offset of its own clock with respect to the clock of the slowest/fastest node of all visited channels.
3. When the proxy node returns to its home channel, if needed it uses the clock offset collected to synchronize the clock of all nodes on its home channel with the slowest/fastest node of all channels visited.
4. Step 2 and 3 are repeated periodically.

The accuracy of the clock synchronization between nodes across multiple channels depends on the connectivity of the channel association graph, i.e., the more channels the proxy node from each channel visits, the more accurate the synchronization that can be achieved with the expense of the higher overhead of dispatching the proxy node to other channels, and the fewer channels the proxy node from each channel visit, the less accurate the synchronization achieved albeit with lower overhead. The decision on how many channels should be associated with each channel is dependent on the requirements of the application.

Second Exemplary Embodiment

A second exemplary embodiment employs a source-based approach rather than a proxy-based approach. FIG. 3 compares the source-based and proxy-based approaches to group communication (GC) in multi-channel wireless networks. As also shown in FIG. 3, the source-based method can operate in either an active or passive mode, while the proxy-based method operates only in the active mode.

A Source node is the node that generates the network management information which can be transmitted as GC packets. In other words, it is the node that wishes to send a GC packet to its neighbors in a multi-channel wireless network (in more technical terms, the node that receives the packet from the network layer). A Proxy node, as disclosed in the first exemplary embodiment above, is a node that is dispatched to other channels on behalf of the other nodes on the same channel. That is, in a multi-channel wireless network, nodes belonging to a particular channel can elect zero or more proxy nodes that are responsible for visiting other channels. It should be noted that depending upon the reference point, proxies can be either foreign proxies or home proxies with respect to nodes of a given channel. A foreign proxy to a channel A is one that was elected by the nodes of some other channel B and that visits channel A as part of its normal procedure. On the other hand, a home proxy of channel A is one that was elected by the nodes belonging to channel A itself.

When applied to the context of GC, the use of a source-based or proxy-based approach provides interesting trade-offs as described below. However, it is important to note that, in a given multi-channel network, these approaches can operate concurrently. For example, some GC packets or even entire GC flows can operate using a source-based approach, while other concurrent GC packets or GC flows can operate using a proxy-based approach. In other words, the characteristic of being proxy-based or source-based can be applied in the same multi-channel network scenario.

In the second exemplary embodiment employing the source-based approach, the burden is placed on the source node to carry out the GC functionality. As shown in FIG. 3, this approach can operate in either an active or a passive mode, depending on whether or not the source is actively switching channels to transmit the GC packets.

In the active mode, the source node is responsible for distributing the GC packets to all channels of the multi-channel wireless network. The source has to transmit the same packet on multiple channels to guarantee its delivery, which requires the source to switch channels for each GC packet transmission. In the passive mode, however, the source-based approach takes a different form. In the passive mode, the source node does not switch channels, but rather stays on its own channel and holds in its cache any GC packets that need to be transmitted. The source then waits for proxies coming from other channels to visit its own channel and transmits all GC packets to the proxy. The source-based approach in the passive mode relies on the existence of proxies of other channels, and that these proxies will eventually visit the source. When this happens, the source transmits all the GC packets in its local cache to the foreign proxy node. The foreign proxy node, in turn, caches all GC packets it receives and retransmits them on other channels as it visits these other channels. Consequently, it is the proxies of other channels that are responsible for switching channels and redistributing GC packets.

The source-based approach in the active mode offers the advantage of low latency as the source node itself takes an active role in switching channels and transmitting the GC packets. If latency is not an issue, the proxy-based scheme can be a suitable solution. Given that proxies will exist anyhow, the proxy-based approach takes advantage of this fact and uses these proxies for supporting GC.

The source-based approach in the passive mode relies on foreign proxies to carry out the GC functionality. The proxy-based approach disclosed above takes advantage of home proxies, that is, takes advantage of proxy nodes belonging to the same channel as the source of the GC packets.

As indicated in FIG. 3, the proxy-based approach operates in the active mode only. In the proxy-based approach, the source of the GC packets can freely transmit these packets over its own channel. The home proxy (as well as all other nodes on the channel) receives these GC packets and caches them internally in a local memory. The home proxy does this for all GC packets received from other nodes in its own home channel for as long as it functions as a proxy node. At the time the proxy initiates its travel through foreign channels, the GC packets cached by the home proxy are retransmitted over each foreign channel visited. The home proxy is responsible for disseminating the GC packets of its home channel through all other channels. However, since the proxy may need to visit foreign channels for other purposes, the proxy-based approach can piggyback thereon the GC functionality.

As seen from the above discussions, MC MAC protocols enable nodes in the same neighborhood to communicate simultaneously in different channels without interfering with one another. This characteristic is very desirable especially in high load scenarios and for QoS sensitive traffic.

A key feature of MC-MAC protocols is that each node uses a local cache to store information about other channels, including which nodes are on which channels, reservations, load, backup channels, connectivity, etc. There are a number of benefits for a node to store this information locally in its cache, including fast node discovery, access to connectivity information, better load balancing across the network, use of optimized scheduling algorithms, ability to make reservations in multiple channels, etc.

On the other hand, the implementation of a caching mechanism by a node is not trivial. A number of situations may arise during a node's operation that may result in the cache becoming stale or requiring update. These two situations are respectively defined as the Stale Cache Problem (SCP) and the Cache Update Problem (CUP).

The SCP deals with the period of time over which the information stored in a node's cache can be said to be reliable. For example, consider that a node A operating on channel C1 knows about the existence (through its cache) of another node B operating on channel C2. In this scenario, the information stored in node A's cache about node B can become stale very quickly if, for example, node B moves or changes channel due to an incumbent occupying its own channel. Therefore, a proper cache policy is needed to remove stale information from a node's local cache due to the SCP.

As its name suggests, the CUP arises when two different versions of the same piece of information need to be compared and there is a need to determine which one is "fresher" (or, alternatively, "newer"). In the case of a node's cache, a node needs to compare the information it receives with the information stored locally in its cache and determine which one is fresher. Only after such verification can the node safely store in its cache the most up-to-date information. As a consequence, a cache policy is needed as to associate freshness with information transmitted and hence address the CUP.

The embodiments of the present invention further provide two cache policies (i.e., solutions) to address the SCP and CUP. The solution to the SCP is based on timers associated with each cache entry that can be dynamically adjusted based on a node's perception of how often the environment around it changes. To address the CUP sequence numbers are provided (similar to the discussion of item (c) of the First Exemplary Embodiment), which are used to associate the idea of freshness with information transmitted by nodes over the air.

A simple and efficient solution to address the SCP is to associate timers with entries of a node's local cache. These timers are set to a value by the node for each relevant cache entry and hence the information stored locally in the node's cache entries are then purged or become invalid after this timer expires.

Therefore, once a node learns about information regarding other channels, it also associates a timer with each of these pieces of information. Different types of information can require different timeout values to be set, since some information is more stable than others. Also, the values of these timers can be dynamically adjustable to adapt to the surrounding environment. For example, in MC network where nodes are mostly static, these timers can take large values and so it can take longer for a node to purge information from its local cache. Conversely, if nodes in the network move at a rapid pace or if the channel availability also changes quickly, these timers can assume shorter values to accommodate the network dynamics.

In fact, existing protocols such as the WiMedia UWB MAC and routing protocols often use timers for purging information in a node's cache. However, this is only done for the information about the node's own channel. That is, nothing is done in existing technology to address the SCP in MC environments.

To address the CUP the present invention introduces the concept of sequence numbers (SNs). In simple terms, SNs are used to associate "freshness" with a given piece of information to which an SN is attached. As nodes transmit information in the wireless medium, they can also associate a SN with that information. Each node maintains its own SN, which is incremented (e.g., by one) by the node, for example, each time it transmits a packet, or each time it transmits updated information, or each time it changes a channel, etc.

Using this scheme, a "freshness" of a given piece of information is defined as follows. A piece of information with SN A is "fresher" than another version of the same piece of information with SN B if, and only if, A>B. A node updates its local state only for those pieces of information received that are "fresher" than the ones it currently has. This is done through SNs which are able to associate freshness with different information.

For this scheme to be implemented, two things are required from the wireless system. Firstly, each piece of information that is required to be stored locally in a node's cache needs to be associated with a SN. In other words, the cache structure needs to incorporate the SN field. Secondly, the MC-MAC protocol in use needs to transmit together with its packets the SN for each piece of information where cache updates are required, and to which the association of "freshness" information is needed (note that SNs may be associated with multiple types of information, and so a packet may contain multiple SNs). With both SNs transmitted in packets as well as in a node's cache, the CUP can be properly overcome.

Finally, note that a key aspect of using SNs has to do with the wrap-around problem. Luckily, however, a number of approaches exist that can deal with the SN wrap-around issue. One of them is to use a very large SN and have the node initialize the SN with a low value. This would make the SN take a long time to wrap-around, and hence make this problem negligible. Another approach is to implement in the MC-MAC protocol, schemes that guarantee (by default) that even if a wrap-around does happen, it will not compromise the protocol behavior or cause cache inconsistencies.

An exemplary embodiment is illustrated in FIG. 4 of a node having a network management information module 400 comprising an own clock 404, a source/proxy channel visiting mechanism 402 including at least one channel visiting component that provides at least one of a source-based and a least one proxy-based channel visiting mechanism; CUP/SCP cache maintenance component using sequence numbers and timers 403 for refreshing and aging the network management information stored in the local cache memory 401 of the node, and a multi-channel clock synchronization module 405 for synchronizing the clocks of the nodes of a home channel with the slowest/fastest clock of the network. Each node on each channel 101 is configured to include a version of the network management information module 400, thereby implementing inter-channel communication of network management information in a multi-channel network according to the present invention and keeping a cache refreshed and free of out of date information, and for an active proxy-based MC mechanism only adapting to changes in node/channel associations, suppressing duplicate inter-channel information, and synchronizing MC clocks.

While, several embodiments of the present invention have been illustrated and described, one skilled in the art will understand that changes may be made in these embodiments without departing from the principles and spirit of the present invention, the scope of which is defined in the appended claims and their equivalents.

What is claimed is:

1. A system for distributing network information in a multi-channel wireless network communication system, comprising:
   a set of a plurality of N channels {i} including a non-empty subset of foreign channels C(i) for each home channel i of the set of channels {i} and for each home channel i of the set of channels {i}, a set of at least one node S(i) tuned to the channel i; and
   a network information module resident at each node and comprising a channel visiting mechanism whereby, for each channel i of the set of the plurality of N channels {i}, current network information is distributed to the set of at least one node S(i) tuned to channel i and maintained thereby in a local own cache storage using a cache maintenance component, said channel visiting mechanism comprising a source-based mechanism and a proxy-based mechanism,
   wherein a proxy node p(i) is defined as at least one node of the sets S(i), i=1, . . . , N that periodically visits each foreign channel j of C(i) to participate in a pre-determined network information sharing procedure therewith and thereafter with the home channel of the proxy node and a source node is a network node S(i) of channel i that sends network information to each node of each channel of the set of N channels.

2. The system of claim 1, wherein the proxy node p(i) is elected by the set of at least one node in S(i).

3. The system of claim 1, wherein the pre-determined network information sharing procedure participated in by the proxy node p(i) of S(i) comprises:

for each channel j visited by p(i), accumulation by p(i) of the network information of channel j and announcement by p(i) of the accumulated network information to all nodes on channel j, whereby the proxy node p(i) also accumulates any source-based network information from any source node s(j) thereby piggybacking source-based functionality on the proxy-based mechanism; and for all nodes on channel j that receive the announcement by p(i), recordation of the announcement and sharing of the announcement with other nodes of the wireless network.

4. The system of claim 3, wherein:

the announcement is a transmitted network message that includes an information element (IE) having a sequence number assigned by one of a node i in S(i), said message being transmitted to all nodes on channel j, said sequence number being incremented by the node i whenever new network information is accumulated thereby;

each node further stores in the own cache of the node the network information obtained, sequence-numbered, and announced in the transmitted network message;

a node newly receiving a network message uses the cache maintenance component to compare the sequence number of the newly received message with that of any network message already received by the node and stored in the own cache and when the sequence number of the newly received network message is higher, the node updates the own cache of the node with the network information of the newly received message and retains the sequence number of the newly received message for comparison with a future received network message sequence number, wherein, the most "fresh" version of network information is stored in the own cache thereby avoiding a cache update problem (CUP) and duplicate information being stored in the cache; and a timer is associated with each network message using the cache maintenance component when it is stored in the own cache and when the timer expires the associated network message is one of purged from the own cache or annotated as invalid in the own cache, thereby avoiding a stale cache problem (SCP).

5. The system of claim 3, wherein the proxy node p(i) of S(i) visits the foreign channels of C(i) in a pre-determined order that minimizes a traversal time of all the foreign channels and lastly visits the home channel of the proxy node p(i) to announce the accumulated network information of all visited foreign channels and obtain and update home channel network information in the own cache of the proxy node p(i).

6. The system of claim 5, wherein the pre-determined network information sharing procedure comprises transmitting and receiving beacons that include said obtained and announced network information.

7. The system of claim 6, wherein the set of foreign channels, C(i) is determined by the rule C(i)={(i+$b_k$) mod N, k=0, 1, . . . , M}, where b is a positive integer larger than 1 and smaller than N, and M is an integer that is larger than or equal to 0 and smaller than $\log_b N$.

8. The system of claim 7, wherein when the proxy node p(i) visits a foreign channel j of C(i) and j is empty, the proxy node:

deletes j from C(i) and searches channels (j+1) mod N, (j+2) mod N, . . . , until p(i) finds an occupied channel j' at which point p(i) includes the channel j' in C(i) and informs the other nodes tuned to the home channel of p(i) of the change; and thereafter when proxy node p(i) visits the foreign channels in an updated C(i) and a given channel k in C(i) is no longer occupied channel, k is deleted by p(i) from C(i), and periodically, the proxy node p(i) attempts to visit channel j"(j.ltoreq.j"<j') and any j" found to be non-empty is included in C(i) and announced to the at least one node S(i) of the home channel.

9. The system of claim 8, wherein:

the announcement is a transmitted network message that includes an information element (IE) having a sequence number assigned by one of a node i in S(i), said message being transmitted to all nodes on channel j, said sequence number being incremented by the node i whenever new network information is accumulated thereby;

each node further stores in the own cache of the node the network information obtained, sequence-numbered, and announced in the transmitted network message;

a node newly receiving a network message uses the cache maintenance component to compare the sequence number of the newly received message with that of any network message already received by the node and stored in the own cache and when the sequence number of the newly received network message is higher, the node updates the own cache of the node with the network information of the newly received message and retains the sequence number of the newly received message for comparison with a future received network message sequence number, wherein, the most "fresh" version of network information is stored in the own cache thereby avoiding a cache update problem (CUP) and duplicate information being stored in the cache; and a timer is associated with each network message using the cache maintenance component when it is stored in the own cache and when the timer expires the associated network message is one of purged from the own cache or annotated as invalid in the own cache, thereby avoiding a stale cache problem (SCP).

10. The system of claim 9, wherein each node further comprises:

an own clock that for nodes on the same channel is synchronized using a clock synchronization method for a single channel network; and a multi-channel clock synchronization module that at a predetermined visiting periodicity, the proxy node p(i) obtains a clock offset information of the own clock of the p(i) and the own clock of a node visited and stores in the own cache of the p(i) the offset of the own clock with respect to a clock of a slower and faster clock of the nodes visited and synchronizes the offset with all nodes on the home channel of the proxy node p(i) when the proxy node p(i) finally visits the home channel after visiting all foreign channels.

11. A method for distributing network information in a multi-channel wireless network communication system having a set of a plurality of N channels {i} including a non-empty subset of foreign channels C(i) for each home channel i of the set of channels {i} and for each home channel i of the set of channels {i}, a set of at least one node S(i) tuned to the channel i, comprising:

to each said at least one node, providing a network information module that includes a channel visiting mechanism comprising a source-based mechanism and a proxy-based mechanism, an own clock, a multi-channel clock synchronization module, and a cache memory;

for each channel of the set of the plurality of N channels {i}, distributing by the channel visiting mechanism current network information to the set of at least one node S(i) tuned to channel i;

maintaining in a local own cache storage in said at least one node, said distributed current network information;

electing a proxy node p(i) as at least one node of the sets S(i), i=1, ..., N that performs periodically visiting each foreign channel j of C(i), participating in a pre-determined network information sharing procedure with each periodically visited foreign channel j of C(i), thereafter, participating in a pre-determined network information sharing procedure with the home channel of the proxy node; and defining a source node as a network node s(i) that sends network information to the at least one node of S(i) of each channel i of the set of N channels {i}.

12. The method of claim 11, wherein the pre-determined network information sharing procedure participated in by the proxy node p(i) of S(i) comprises:

for each channel j visited by p(i), performing accumulating by p(i) the network information of channel j, announcing by p(i) the accumulated network information to all nodes on channel j, and piggybacking source-based functionality on the proxy-based mechanism through the accumulation and announcement of any source-based network information from any visited source node s(j);

for all nodes on channel j that receive the announcement by p(i), performing recording the announcement in an own cache, and sharing the announcement with other nodes of the wireless network.

13. The method of claim 12, further comprising:

using a cache maintenance component, sequentially sequence numbering each announced network information;

using the cache maintenance component each node further stores in the own cache of the node the network information obtained, sequence-numbered, and announced in a transmitted network message;

comparing the sequence number of a newly received message with that of any network message already received;

when the sequence number of the newly received network message is higher, the network information of the newly received message retaining the newly received message as the most "fresh" version of network information is stored in the own cache wherein a cache update problem (CUP) and duplicate information being stored in the cache are both avoided;

using the cache maintenance component, associating a timer is associated with each network message when it is stored in the own cache; and when the timer of the associated network message expires, using the cache maintenance component to perform a step selected from the group consisting of purging expired network information from the own cache and annotating as invalid expired network information in the own cache, wherein a stale cache problem (SCP) is avoided.

14. The method of claim 12, further comprising the proxy node p(i) of S(i) using the channel visiting component to perform:

visiting the foreign channels of C(i) in a pre-determined order that minimizes a traversal time of all the foreign channels; and visiting the home channel of the proxy node p(i) to announce the accumulated network information of all visited nodes and obtain and update home channel network information in the own cache of the proxy node p(i).

15. The method of claim 14, further comprising:

synchronizing an own clock with nodes on the same channel using a clock synchronization method for a single channel network;

configuring the multi-channel clock synchronization module such that at a predetermined visiting periodicity, the proxy node p(i) performs obtaining a clock offset information of the own clock of the p(i) and the own clock of a node visited, and storing in the own cache of the p(i) the offset of the own clock with respect to a clock of a slower and faster clock of the nodes visited, and synchronizing the offset with all nodes on the home channel of the proxy node p(i) when the proxy node p(i) finally visits the home channel after visiting all foreign channels.

16. The method of claim 11, wherein a network information apparatus for distributing network information in a multi-channel (MC) wireless network, comprising a network information module is configured to perform the method, thereby implementing inter-channel communication of network information in a multi-channel network according and keeping a cache thereof refreshed and free of out-of-date information, and, for an active proxy-based MC sharing mechanism thereof only, adapting to changes in node/channel associations, suppressing duplicate inter-channel information, and synchronizing MC clocks.

17. A method for distributing network information in a multi-channel wireless network communication system having a set of a plurality of N channels, comprising:

defining each of the plurality of channels as a home channel including a non-empty subset of foreign channels for each home channel of the set of channels and at least one node tuned to the home channel;

for each channel of the set of the plurality of N channels, distributing by a channel visiting mechanism current network information to the at least one node tuned thereto;

maintaining in the local own cache storage of said at least one node, said distributed current network information; and for each home channel, electing a proxy node as the at least one node to perform the channel visiting mechanism, wherein the channel visiting mechanism comprises:

periodically visiting each foreign channel of the home channel, participating in a pre-determined network information sharing procedure with each periodically visited foreign channel of the home channel, and thereafter, participating in the pre-determined network information sharing procedure with the home channel of the proxy node.

18. The method of claim 17, further comprising:

to each said at least one node, providing a network information module that includes the channel visiting mechanism as comprising a source-based mechanism and a proxy-based mechanism, an own clock, a multi-channel clock synchronization module and a local own cache memory.

19. The method of claim 18, wherein the pre-determined network information sharing procedure participated in by the proxy node comprises:

for each foreign channel visited, performing accumulating the network information of the foreign channel, announcing the accumulated network information to all nodes on the foreign channel, and piggybacking a source-based functionality on the proxy-based mechanism through the accumulation and announcement of any source-based network information from any visited source node;

for all nodes on the foreign channel that receive the announcement, performing recording the announcement in an own cache, and sharing the announcement with other nodes of the wireless network.

20. The method of claim 19, further comprising:

using a cache maintenance component sequentially sequence numbering each announced network information;

using the cache maintenance component each node further stores in the own cache of the node the network information obtained, sequence-numbered, and announced in a transmitted network message;

comparing the sequence number of a newly received message with that of any network message already received;

when the sequence number of the newly received network message is higher, the network information of the newly received message retaining the newly received message as the most "fresh" version of network information is stored in the own cache wherein a cache update problem (CUP) and duplicate information being stored in the cache are both avoided;

using the cache maintenance component, associating a timer is associated with each network message when it is stored in the own cache; and when the timer of the associated network message expires, using the cache maintenance component to perform a step selected from the group consisting of purging expired network information from the own cache and annotating as invalid expired network information in the own cache, wherein a stale cache problem (SCP) is avoided.

21. The method of claim 19, further comprising the proxy node using a channel visiting component to perform:

visiting the foreign channels in a pre-determined order that minimizes a traversal time of all the foreign channels; and visiting the home channel of the proxy node to announce the accumulated network information of all visited nodes and obtain and update home channel network information in the own cache of the proxy node.

22. The method of claim 21, further comprising:

synchronizing an own clock with nodes on the same channel using a clock synchronization method for a single channel network;

configuring a multi-channel clock synchronization module such that at a predetermined visiting periodicity, the proxy node performs obtaining a clock offset information of the own clock of the proxy node and the own clock of a node visited, and storing in the own cache of the proxy node the offset of the own clock with respect to a clock of a slower and faster clock of the nodes visited, and synchronizing the clock offset with all nodes on the home channel of the proxy node when the proxy node finally visits the home channel after visiting all foreign channels.

* * * * *